(No Model.) 2 Sheets—Sheet 1.
P. E. LITTLE.
CULTIVATOR.
No. 604,992. Patented May 31, 1898.
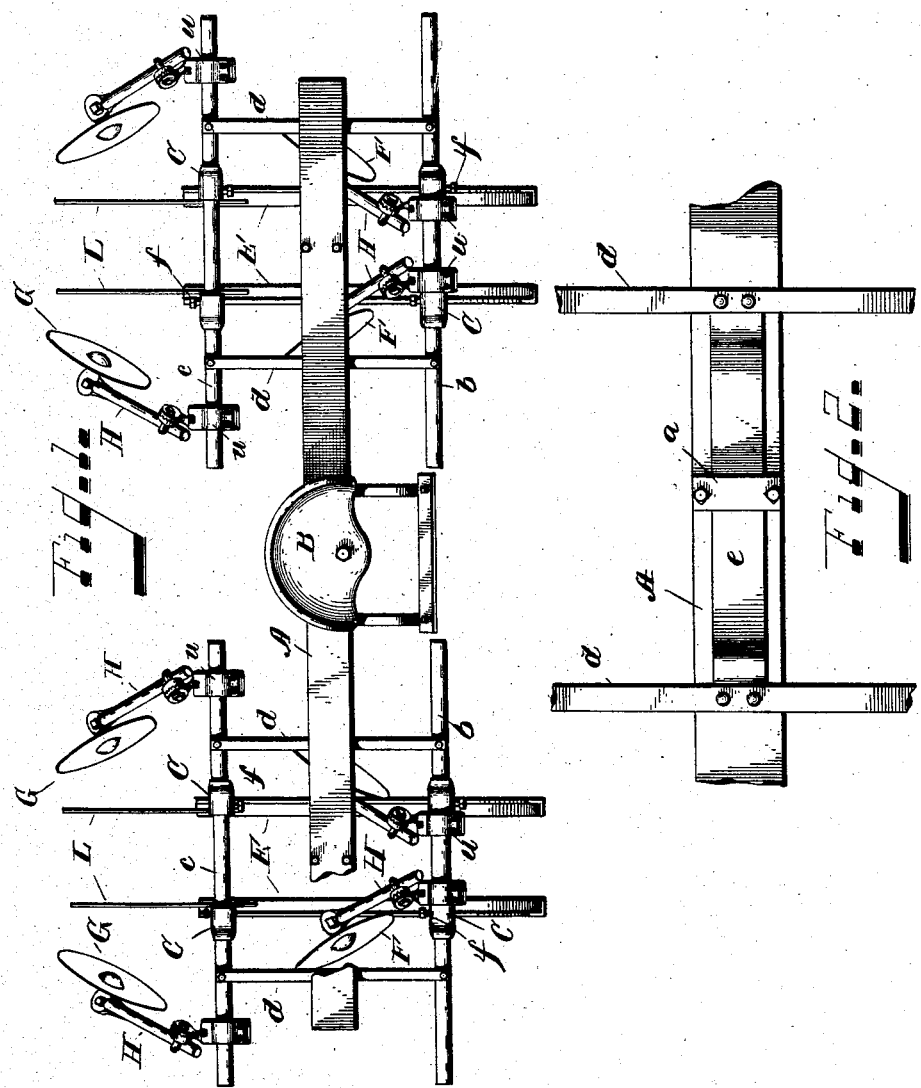
Witnesses
Bernard J. Hausfeld
H. C. Edwards
Inventor
Peter E. Little
by Alfred M. Allen
Attorney

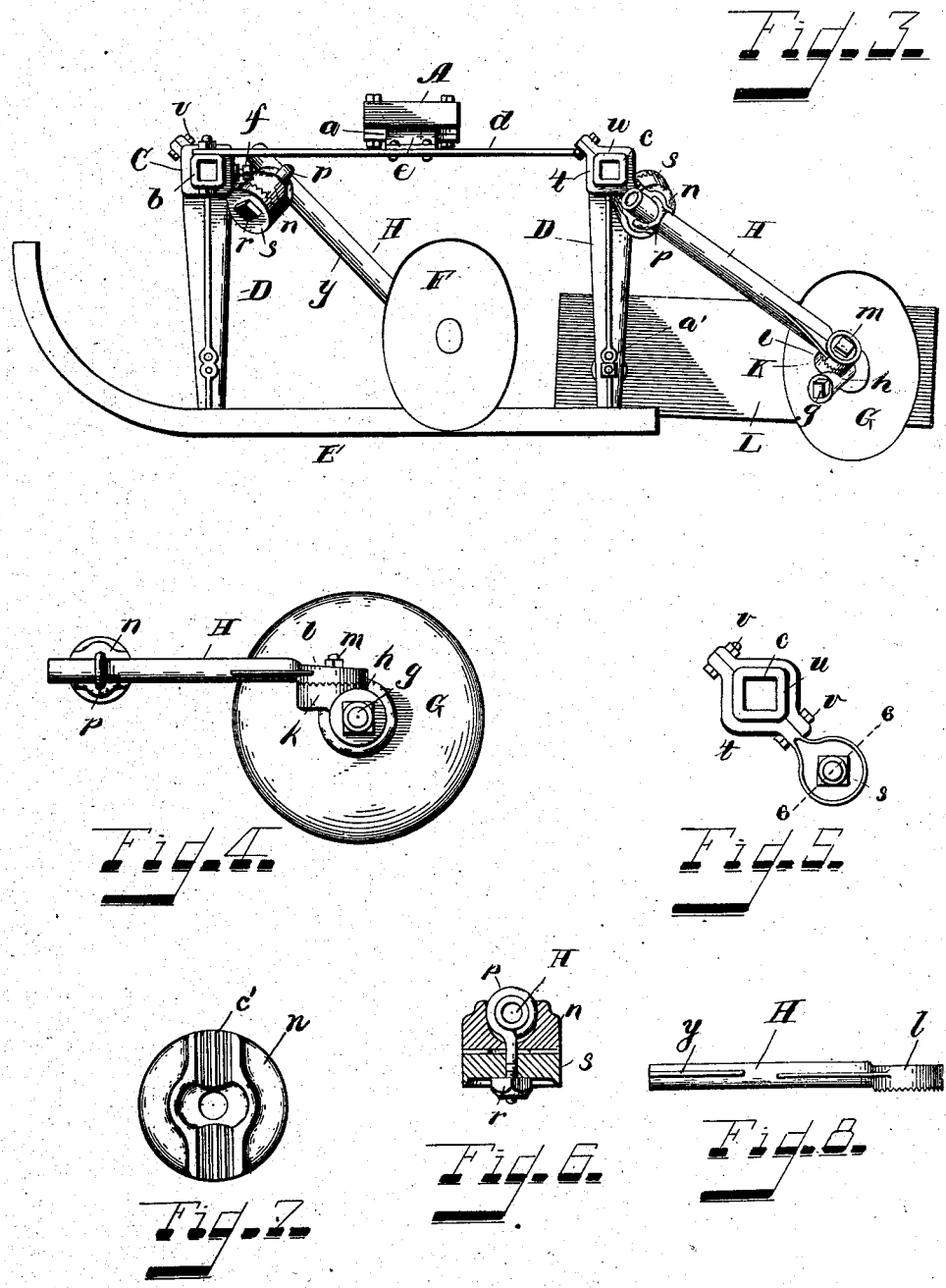

UNITED STATES PATENT OFFICE.

PETER E. LITTLE, OF DAYTON, OHIO, ASSIGNOR TO THE OHIO RAKE COMPANY, OF SAME PLACE.

CULTIVATOR.

SPECIFICATION forming part of Letters Patent No. 604,992, dated May 31, 1898.

Application filed November 10, 1897. Serial No. 658,007. (No model.)

*To all whom it may concern:*

Be it known that I, PETER E. LITTLE, a citizen of the United States, residing at Dayton, in the county of Montgomery and State of Ohio, have invented certain new and useful Improvements in Cultivators, of which the following is a full, clear, and exact description, reference being had to the accompanying drawings, forming part of this specification.

My invention relates to agricultural implements adapted for the cultivation of listed crops, more particularly for growing corn, in which the listed furrows vary considerably in depth and width and in which the ordinary shovel-cultivators cannot be used with success by reason of this variation in width and depth of the furrows. For this reason machines have been heretofore constructed carrying cultivator disks or knives mounted in frames arranged to follow the furrows and automatically adjust themselves laterally to the varying furrow widths.

The special features of the invention consist in the employment of two pairs of rotary disks at front and rear acting in connection with each other to thoroughly cultivate the ground and cut out the weeds around the growing plants and interchangeable with each other to throw the dirt either out or in, as may be desired, and in the multiple adjustability of the disks to suit any character of ground or width of furrow, all of which features of novelty will be hereinafter more particularly pointed out and claimed.

In the drawings, Figure 1 is a top plan view of my improved cultivator. Fig. 2 is a bottom view of a portion of one cultivator-frame and seat-bar. Fig. 3 is a side elevation of the cultivator. Fig. 4 is a side elevation view of one of the cultivator disks and supports. Fig. 5 is a detail view of the coupling for the disks. Fig. 6 is a cross-section of same on lines 6 6 of Fig. 5. Fig. 7 is a top plan view of one of the ratchet-plates, and Fig. 8 is a side view of one of the disk-hangers.

A is the seat-board, constituting what may be called the "main" frame of the machine, upon which is mounted in the usual way the seat B. Bolted to the under surface of the seat-board and transverse the same and at convenient distances from the ends are straps $a\ a$, by means of which the cultivator-frames proper are attached to the seat-board or main frame. These frames are made up of bars $b\ b$ and $c\ c$, preferably of metal and rectangular in cross-section, bolted together by the cross-pieces $d\ d$ to form a rigid frame, while a flat plate or bar $e$ is securely bolted between the cross-pieces $d\ d$ parallel to the bars $b\ b$ and $c\ c$. This plate or bar $e$ is secured under the strap $a$, as shown in Fig. 2, and the cultivator-frame is thus attached to the seat-bar, so as to allow a free lateral movement of the cultivator-frame. Secured on the bars $b\ b$ and $c\ c$ by set-screws $f\ f$, so as to be adjustable thereon, are the collars C C, which carry standards D D, to which runners E E are bolted, this arrangement allowing the runners to be adjusted toward or away from each other to suit the width of the furrows, as will be hereinafter described.

F F are the forward and G G the rear cultivator-disks. Each of these disks is mounted on a short axle $g$, carried in a ball-bearing journal-box $h$, which box is provided with an annular ratchet-plate $k$, meshing with a corresponding plate $l$ on the supporting-arm or hanger H, the two plates being locked together by the bolts and nuts $m$. The upper ends of the hangers H are secured in the recesses of the ratchet-plates $n\ n$ by the straps $p$, encircling the same, and the arm and plate are secured by nut $r$ to the corresponding ratchet-plate $s$, and a part of the lower half of the coupling-block $t$, by means of which, in connection with the upper half of the coupling-block $u$ and the bolts $v\ v$, the arms H H and the cultivators are secured one set to the rear bar $c$ and the other set to the front bar $b$ of the cultivator-frame. It will be evident from this construction that the cultivator-disks may be adjusted into any position desired to suit any and all requirements of cultivation. The disks can be adjusted to and away from each other on the frame-bars $b$ and $c$ by loosening the bolts $v\ v$. They can be raised or lowered by turning plate $n$ on plate $s$, and the vertical angle of each disk can be varied by loosening bolt $p$ and rotating the hanger H, and in this connection to hold the arm H normally secure a rib $y$ is formed on each arm, while creased recesses $c'$ are formed on the ratchet-plate to receive this rib in order to lock the hanger to the plate $n$. Furthermore, the angle of cut can be varied by rotation of the plates $k$ on the plates $l$ and the length of arm H adjusted by securing the arms at any desired place to the strap-bolts $p$. In fact, there is no position into which the cultivator-disks cannot be adjusted.

The cultivator-disks are of the usual concavo-convex type, and it will be noticed that they are in each case mounted on the convex side of the disk, leaving the concave side free and open, the head of the axle-bolt alone appearing on the concave side. The disks can be adjusted to throw the dirt either to or away from the plants, as may be desired; but, however adjusted, as the concave side is always the cutting side no dirt or trash can be accumulated on the cutting side to retard and clog the operation of the cultivator. Heretofore, so far as I am aware, the disks have been coupled to the hangers on the concave side, so that my arrangement forms a novel and exceedingly advantageous construction.

In connection with the rear disks I provide a pair of guard-boards or shields L, which are secured by nuts and bolts to the rear runner-standards D D, two or more openings $a'$ being left for that purpose in the standards, so that they may be raised or lowered at their forward ends and at the same time the guards may be swung on their retaining-bolts as a pivot and raised or lowered at their outer ends.

The operation of the cultivator will be evident from the above description. Having adjusted the runners E for the width of the furrow and the pairs of disks with the guard-boards to suit the requirements, the cultivator is driven over the field desired to be cultivated. The runners sink to the bottom of the furrow, with the growing plants between them, and the free lateral movement of the frames allow the runners to be guided by the furrows no matter how uneven or what the variation in distance between them.

As already stated, the front pair of disks may be adjusted to throw the dirt either out and away from the plants or reversed and used to hill up the corn, as may be desir d.

When the front pair of disks are cupped to throw the dirt away from the plants and to carry the dirt outwardly, the rear disks following, cupped in the opposite direction, cut out the weeds and level down the ridge left by the front cultivators, the guards being adjusted to allow just as much or as little dirt as desired being thrown toward the plants.

Heretofore disk cutters have been used on cultivators of this kind; but, so far as I am aware, only a single pair of disks have been employed, arranged in front for the first cultivation and transferred to the rear for the second and final operation; but with my improvements the result of the two operations can be obtained with a single use of the implement.

While I have shown my improvement as applied to a two-row cultivator, it will be evident that the machine, if desired, can be enlarged to take in three or more rows or that but a single laterally-adjustable frame may be employed and the machine reduced to a single-row implement.

Having thus described my invention, what I claim, and desire to secure by Letters Patent, is—

1. In a cultivator, the combination, with the seat-bar and automatic laterally-adjustable cultivator-frames therefor, with means for attaching same to the seat-bar, of two pairs of similar rotary disks, with similar means for adjustably securing same to the cultivator-frames, whereby said disks may be interchangeable, the one pair attached to the front bar of said frame, the other pair attached to the rear bar, and each pair adjustable to throw the dirt in opposite directions, with respect to the cultivated plants, substantially as shown and described.

2. In a cultivator, the combination, with seat-bar, and automatic laterally-adjustable cultivator-frames therefor, with means for attaching same to the seat-bar, and two pairs of similar rotary disks, with similar means for adjustably securing same to the cultivator-frames, whereby said disks may be interchangeable, the one pair attached to the front bar of said frame, the other pair attached to the rear bar, and each pair adjustable to throw the dirt in opposite directions, with respect to the cultivated plants, with adjustable shields attached to the runner-frames opposite said rear disks, substantially as shown and described.

3. In a cultivator, provided with rotary cultivating-disks, a hanger therefor, with coupling-block for securing same to the frame, and journal-bearing for the disk, said hanger being provided with ratchet-plates at each end, and corresponding ratchet-plates on said coupling-block and disk-journal meshing therewith, substantially as shown and described.

4. In a cultivator, provided with concavo-convex rotary cultivating-disks, a hanger therefor, with coupling-block for securing same to the frame and antifriction journal-bearings for the disks mounted on the convex side thereof, said hanger being provided with ratchet-plates at each end and corresponding ratchet-plates on said coupling-block and disk-journal meshing therewith, substantially as shown and described.

5. In a cultivator, provided with rotary cultivating-disks, a rotatable and longitudinally-adjustable hanger, coupling-block for securing same to the frame, and journal-bearing for the disk, said hanger being provided with ratchet-plates at each end, and corresponding ratchet-plates on said coupling-block and disk-journal meshing therewith, whereby universal adjustment may be had for said disks, substantially as shown and described.

6. In a cultivator, provided with rotary cultivating-disks, a hanger therefor with coupling-block for securing same to the frame, said block being provided with a ratchet-plate, and a corresponding ratchet-plate meshing therewith, strap encircling said hanger and passing through said plates for securing same, said hanger being provided with a rib and the intermediate ratchet-plate being recessed and grooved to receive said rib and prevent the hanger from turning, substantially as shown and described.

PETER E. LITTLE.

Witnesses:
E. J. FINKE,
W. H. H. ECKI.